June 7, 1955 F. C. TEA, JR 2,710,230

CULTIVATOR WHEEL

Filed Oct. 27, 1952

INVENTOR
FRANK C. TEA, JR.
BY Toulmin & Toulmin
ATTORNEYS

United States Patent Office 2,710,230
Patented June 7, 1955

2,710,230

CULTIVATOR WHEEL

Frank C. Tea, Jr., Bellevue, Ohio, assignor to The American Baler Company, Bellevue, Ohio, a corporation of Ohio Application October 27, 1952, Serial No. 317,083

9 Claims. (Cl. 301—64)

This invention relates to a wheel for a cultivator or soil crusher or the like, and to a method of manufacturing the same.

In cultivators and soil crushers and similar pieces of agricultural equipment, an important element is quite often a wheel member, usually annularly ridged, which is employed for the purpose of crushing the ground in order to remove clods therefrom generally prior to seeding the ground.

A wheel of this type can generally be made rather light because they are used in multiple and extreme working stresses are not built up in the wheels during their operation. This is particularly true in the type soil with which these devices are employed, because such crushing of the ground can only be accomplished when the ground is already fairly well broken up and is in a rather easily crumbled condition. Extremely rough, hard and irregular ground is not suitable for the employment of ground crushing devices of this nature, and, therefore, it can be expected that the individual wheels of the crusher will not be severely loaded and strained.

For the reasons given above, it is possible to make a wheel of this nature rather thin, so far as the wall section is concerned, and this has lead to constructing the wheels in the form of hollow castings. This practice, however, involves rather difficult and expensive coring operations, and thus leaves much to be desired in the way of an economical method of manufacturing a wheel of this nature.

The present invention has for its particular object the provision of an improved method of manufacturing a soil crushing wheel of the nature referred to which will eliminate the difficulties and uneconomical practices referred to above.

A still further object of this invention is the provision of an improved crusher or cultivator wheel of the nature referred to, which is easily manufactured, and which is strong and light.

A particular object of this invention is to provide an improved crusher or cultivator wheel formed in two parts which can be secured together to form the complete wheel, and to a method of manufacturing and assembling the said wheel.

In brief, the objects of this inventtion are attained by forming a crusher or cultivator wheel of substantially identical halves adapted for being brought together in face-to-face engagement in a plane at right angles to the axis of rotation of the wheel while a central member is provided on the axis for securing the two parts of the wheel together.

The central member is preferably tubular but may comprise an axial pin including radial projections engaging the outer surfaces of the wheel halves and the wheel halves comprise cam surfaces engaged by the radial portions of the pin so the two halves of the wheel are tightly clamped together.

The exact nature of my invention, and the objects and advantages thereof referred to above, as well as still other objects and advantages, will become more apparent upon reference to the following specification taken in connection with the accompanying drawings, in which.

Figure 1:
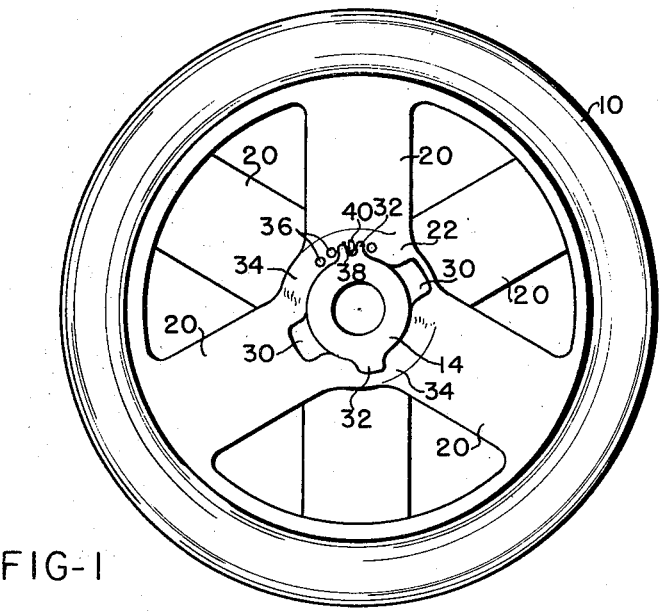
Figure 1 is a side elevational view of a wheel according to my invention.
Figure 2:
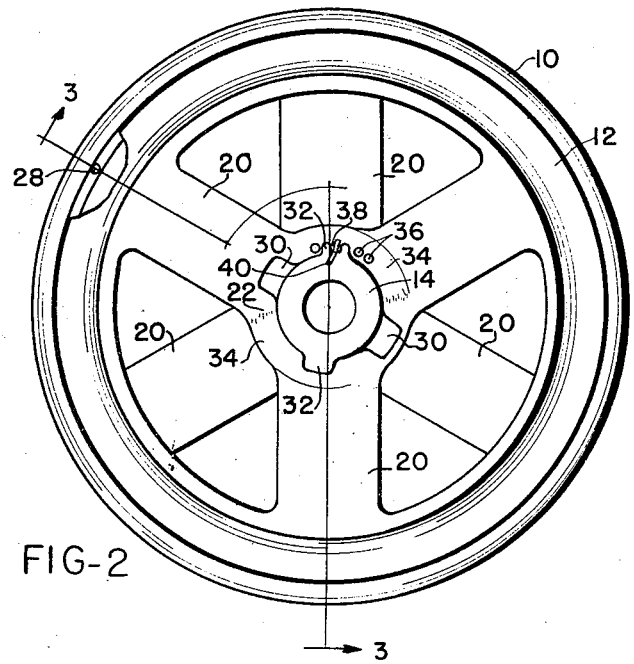
Figure 2 is a view like Figure 1, but looking in from the opposite side of the wheel.
Figure 4:
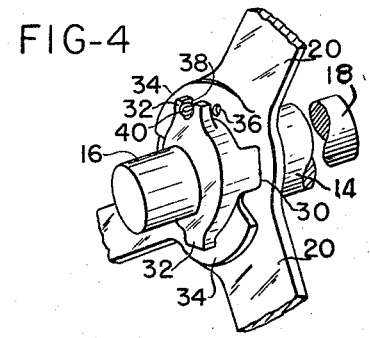
Figure 4 is a perspective view showing the cam surfaces on one of the halves of the wheel and the manner in which the lugs on the central member cooperates therewith, with the member in this figure illustrated as an axle pin.
Figure 3:
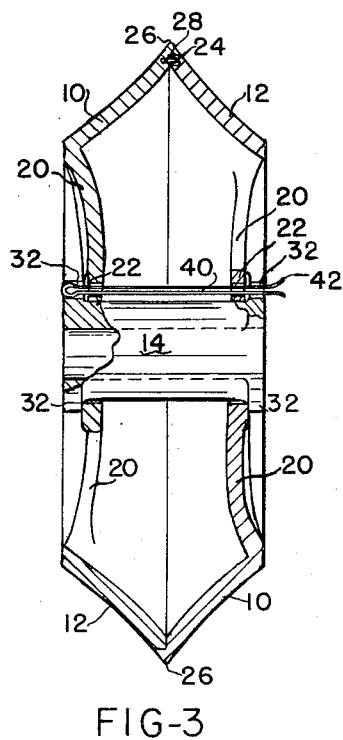
Figure 3 is a sectional view through the wheel, indicated by line 3—3 on Figure 2.

Referring to the drawings somewhat more in detail, and in particular to Figures 1, 2 and 3, the cultivator or crusher wheel, according to my invention, comprises the two parts 10 and 12 which are retained together by a central member 14 which may also serve as an axle for the assembled wheel or is illustrated in Figure 4, by virtue of the end portions 16 and 18 thereof.

Each of the parts 10 and 12 comprises a plurality of radial spokes 20 that terminate at their inner ends in a central hub portion 22.

Part 12 of the wheel is adapted at its outer periphery to fit relatively closely into the shouldered recess 24 formed about the peripheral portion of part 10 of the wheel. As will be seen in Figure 3, parts 10 and 12 form a ridged configuration when assembled with the very peak of the ridge, at 26, consisting of the outermost peripheral part of wheel part 10.

One of the parts 10 and 12, adjacent its periphery, carries one or more locking elements 28 receivable in a correspondingly shaped recess in the peripheral portion of the other wheel part so that when the wheel parts are assembled as in Figure 3, with the locking elements received in their corresponding recesses, the said wheel parts are held against rotation with respect to each other.

Each of the central hub portions 22 has an aperture for receiving the central member 14 and each said aperture comprises the radially extending notches 30 which are provided for the purpose of admitting the radially outwardly extending wings or lugs 32 formed on the opposite ends of the central member 14.

Each of the central hub portions 22 is likewise provided with a pair of diametrically opposite cam portions 34 which commence adjacent one side of one of the notches 30 and increase in height around about 120° of the circumferentially extent of the pertaining hub portion. This arrangement is best seen in Figure 4 and it will be understood that, preferably, both of the wheel parts are formed in this manner with the cam surfaces as described.

In one of the cam surfaces on each of the wheel parts there are formed a plurality of apertures 36 with the apertures in the wheel parts aligning axially when the wheel is assembled. On each of the wings or lugs 32 at each end of member 14 is provided a notch 38 adapted for registration with the adjacent apertures 36 as will best be seen in Figures 1 and 2.

The described arrangement is availed of for tightly clamping the two parts of the wheel together in the following manner: the two parts of the wheel 10 and 12, are first brought into assembled relation as they are seen in Figure 3. The central member 14 is then inserted through the apertures in the centers of the hub portions 22 of the wheel parts by aligning the lugs 32 on the pin with the notches 30 and then inserting the pin by straight axial movement to its proper axial position.

The member 14 is then rotated so that lugs 32 move up the cam surfaces 34 to the point where the wheel parts are tightly clamped together and with the notches 38 registered with one of the apertures 36 in each wheel part. A cotter key or similar device such as indicated in 40 is then inserted through the apertures 36 with which the notches 38 are aligned and the end thereof either bent over or split as at 42 in Figure 3, whereupon the assembling of the wheel is completed.

The assembled wheel, including the axle means provided therefor by the portions 16 and 18 and central member 14, can then be assembled in combination with similar wheels in a cultivating or soil crushing device.

It will be apparent that the forming of the two parts of the wheel is quite simple and can be carried out by ordinary casting procedures with no coring of the mold being required. A minimum amount of machine work is required on the wheel parts in order to bring them into condition for assembly and a minimum of effort and skill is required to accomplish the assembling of the wheel and to install the wheel in a cultivating device.

The wheel manufactured according to my invention, is extremely strong, is light, can be cheaply manufactured and easily assembled.

My invention lends itself to the making of relatively small wheels but can be employed in the manufacture of wheels of substantial size. Likewise, whereas the wheel illustrated is one having a ridge about the central part of its periphery, a wheel concave in cross section could be manufactured in substantially the same manner and the same advantages would obtain.

I have illustrated and described in this application, the formation of the two wheel parts as substantially identical members, and, in fact, the wheel parts as I show them could be made exactly identical and the necessary differences therein be taken care of by machine operations after the wheel parts are cast. However, it will be evident that the two parts of the wheel could be substantially different within the scope of my invention. Thus, for example, only one of the hubs of the wheel parts might comprise cam surfaces with the other being planar, and substantially equivalent results could be obtained in connection with locking the wheel halves together. Also, in the wheel I have illustrated the central axial locking means 14 as comprising both a solid member and a tubular member, this element is preferably formed as a hollow tube and the axle for the wheel would then comprise a shaft or rod extending through the tubular central member with adjacent wheels abutting at the small diameter of their perpiheral surfaces.

It will be understood that this invention is susceptible to modification in order to adapt it to different usages and conditions, and, accordingly, it is desired to comprehend such modifications within the scope of the appended claims.

I claim:

1. In a wheel comprising a rim and a hub; two separable parts each consisting of a portion of said rim and a portion of said hub, said hub portions comprising registering bores on the axis of the wheel, each said bore including a radial notch, a member receivable closely in said bores, and radial lugs on the member adapted to pass through said notches, and said lugs being spaced so as to engage the opposite outside faces of said hub portions whereby rotation of the member after it is inserted in said bores will retain the said parts assembled.

2. In a wheel comprising a rim and a hub; two separable parts each consisting of a portion of said rim and a portion of said hub, said hub portions comprising registering bores on the axis of the wheel, each said bore including a radial notch, a member receivable closely in said bores, and radial lugs on the member adapted to pass through said notches, and said lugs being spaced so as to engage the opposite outside faces of said hub portions whereby rotation of the member after it is inserted in said bores will retain the said parts assembled, said outside faces of said hub portions comprising circumferential cam surfaces rising axially on the said faces away from said notches so the said rotation of the member will draw the said parts tightly together.

3. In a wheel comprising a rim and a hub; two separable parts each consisting of a portion of said rim and a portion of said hub, said hub portions comprising registering bores on the axis of the wheel, each said bore including a radial notch, a member receivable closely in said bores, and radial lugs on the member adapted to pass through said notches, and said lugs being spaced so as to engage the opposite outside faces of said hub portions whereby rotation of the member after it is inserted in said bores will retain the said parts assembled, said outside faces of said hub portions comprising circumferential cam surfaces rising axially on the said faces away from said notches so the said rotation of the member will draw the said parts tightly together, and means for locking said member and said parts against relative rotation.

4. In a wheel comprising a rim and a hub; two separable parts each consisting of a portion of said rim and a portion of said hub, said hub portions comprising registering bores on the axis of the wheel, each said bore including a radial notch, a member receivable closely in said bores, and radial lugs on the member adapted to pass through said notches, and said lugs being spaced so as to engage the opposite outside faces of said hub portions whereby rotation of the member after it is inserted in said bores will retain the said parts assembled, said outside faces of said hub portions comprising circumferential cam surfaces rising axially on the said faces away from said notches so the said rotation of the member will draw the said parts tightly together, and means extending through said member and hub portions for locking said member and said parts against relative rotation.

5. In a wheel comprising a rim and a hub; two separable parts each consisting of a portion of said rim and a portion of said hub, said hub portions comprising registering bores on the axis of the wheel, said hub portions comprising registering bores on the axis of the wheel, at least one such bore in one hub portion comprising a radial notch, a member adapted for fitting said bores, having means to engage the outer face of the other hub portion, and a lug adapted for passing through said notch so rotation of said member after it is inserted in said bores will retain said parts together, the outer face of the said one hub portion comprising a cam surface co-operating with said lug so the said rotation of the member will wedge the parts together, and means for locking said member to the said one hub portion in a plurality of rotated positions.

6. In a wheel comprising a rim and a hub; two separable parts each consisting of a portion of said rim and a portion of said hub, said hub portions comprising registering bores on the axis of the wheel, each said bore including a radial notch, a member receivable closely in said bores, and radial lugs on the member adapted to pass through said notches, and said lugs being spaced so as to engage the opposite outside faces of said hub portions whereby rotation of the member after it is inserted in said bores will retain the said parts assembled interfitting elements on said parts to prevent relative rotation thereof when assembled, and means for locking said member and parts together in the said rotated position of said member.

7. In a wheel of the nature described having a rim and a hub; two separable parts making up the wheel, each comprising a peripheral portion making up a portion of the rim of the wheel and a hub portion making up a portion of the hub of the wheel, said peripheral portions being formed for telescopic engagement to prevent radial shifting of the assembled parts, inter-engaging means on said peripheral portions for preventing angular shifting of the assembled parts, said hub portions being provided with a central aperture, an axle member extending through said aperture, and cooperating elements of a wedging cam means on said member and the outer faces of said hub portions responsive to rotation of the member for wedging said parts together in assembled relation.

8. In a wheel; two thin walled cup members adapted for being brought together with their peripheral edges in engagement, an axle member traversing said members on the axis of the wheel defined thereby, and co-operating elements of a wedging cam means on said axle member and the outer faces of said cup members whereby rotation of the axle member will wedge the cup members together in assembled relation.

9. In a wheel; two thin walled substantially frusto-conical cup members adapted for being assembled with the greatest diameter of their peripheral edges in engagement, an axle member traversing said members on the axis of the wheel, and co-operating elements of a wedging cam means on said axle member and the outer faces of said cup members whereby rotation of the axle member will wedge the cup members in assembled relation, the extreme ends of said axle member being within the axial limits of the wheel, and said axle member being hollow to receive an axle shaft or rod.

References Cited in the file of this patent

UNITED STATES PATENTS

| | | |
|---|---|---|
| 156,240 | Stultz | Oct. 27, 1874 |
| 158,758 | Turner | Jan. 12, 1875 |
| 640,553 | Fowle | Jan. 2, 1900 |
| 1,085,090 | Lachman | Jan. 20, 1914 |
| 1,444,224 | Wagner | Feb. 6, 1923 |

FOREIGN PATENTS

| | | |
|---|---|---|
| 121,268 | Germany | Dec. 9, 1900 |
| 589,068 | France | Feb. 16, 1925 |